United States Patent [19]

Isberg

[11] 3,827,353

[45] Aug. 6, 1974

[54] CHRISTMAS TREE BALING MACHINE

[75] Inventor: Jon Lewis Isberg, Molalla, Oreg.

[73] Assignee: Yule Tree Farms, Mollalla, Oreg.

[22] Filed: Apr. 12, 1973

[21] Appl. No.: 350,323

[52] U.S. Cl. ................... 100/232, 100/8, 100/26, 100/100, 100/255, 100/278, 100/295
[51] Int. Cl. .............................. B30b 7/04
[58] Field of Search ........ 100/8, 26, 100, 255, 278, 100/295, 232, 246, 252, 253, 3

[56] References Cited
UNITED STATES PATENTS

| | | | |
|---|---|---|---|
| 1,105,900 | 8/1914 | Gibbs | 100/232 X |
| 2,000,382 | 5/1935 | Evans et al. | 100/252 X |
| 2,400,661 | 5/1946 | Struensee et al. | 100/278 X |
| 2,696,164 | 12/1954 | Droll | 100/278 X |
| 3,152,538 | 10/1964 | Bricillo et al. | 100/232 X |

*Primary Examiner*—Billy J. Wilhite
*Attorney, Agent, or Firm*—Roger B. Webster

[57] ABSTRACT

A machine, for field use on a Christmas tree farm, adapted to support a pallet and embodying mechanism operative to compress a loose-bulk stack of cut Christmas trees into a compact bale on the pallet; the bale then being strapped to said pallet for transport from field to market.

10 Claims, 16 Drawing Figures

CHRISTMAS TREE BALING MACHINE

BACKGROUND OF THE INVENTION

On commercial Christmas tree farms the trees, as cut, are—under present practice—first manually loaded in loose bulk on a field vehicle, and thence carried thereby to a loading station at which the trees are manually transferred from such field vehicle to a highway cargo vehicle, and on which the trees are again loaded in loose bulk; the load then being encompassed by conventional hold-down ropes or cables. This practice, over and above frequently experienced injury to the trees, is unsatisfactory in that the operation requires too great an expenditure of time and labor.

The present invention was conceived by me in a successful effort to expedite the operation; i.e., to facilitate transport of cut Christman trees from field to market, while minimizing injury to the trees.

SUMMARY OF THE INVENTION:

The present invention provides, as a major object, a novel machine—for field use on a Christmas tree farm—adapted to receive a loose-bulk stack of cut Christmas trees, and embodying mechanism operative to compress such stack of trees into a compact bale on a pallet supported in the machine; the bale then being strapped to the pallet for ready and convenient transport from field to market.

The present invention provides, an another important object, a machine, as above, wherein—by virtue of compressing the loose-bulk stack of trees into a compact bale strapped to a pallet-the handling and transport of the trees from field to market is greatly facilitated and results in a substantial reduction of the time factor and labor costs, as well as minimizing injury to the trees. Further, by baling the trees there is a desirable lessening of the space occupied thereby in transit to market and in storage prior to sale.

The present invention provides, as an additional important object, a machine, as above, in which the mechanism thereof includes parts adapted to form a novel baling chamber which, in sequential operation, is reduced under power both in a horizontal direction and a vertical direction.

The present invention provides, as a further object, a Christmas tree baling machine which is designed for ease and economy of manufacture.

The present invention provides, as a still further object, a practical, reliable, and durable Christmas tree baling machine, and one which is exceedingly effective for the purpose for which it is designed.

DESCRIPTION OF THE PREFERRED EMBODIMENT

Referring now more particularly to the drawings and to the characters of reference marked thereon, the machine comprises a heavy-duty longitudinal main or chassis frame, indicated generally at 1, fitted adjacent the rear end with an axle 2 having wheels 3 thereon; there being a towing hitch 4 at the front end of such main frame 1.

A rigid elevated platform 5 is mounted in connection with the main frame 1 at its front end, and such platform supports an engine 6 and an engine-driven hydraulic pump 7. A hydraulic accumulator tank 8 is mounted adjacent the engine.

As all of the hereinafter described power devices (power cylinders and fluid motors) of the machine are operated by hydraulic pressure, and controlled through the medium of a conventional valve-regulated conduit system, such system—for the sake of clarity—is here omitted.

The main frame 1 includes transversely spaced, longitudinal side beams 9, and on each there is a roller-guided carriage 10 having skirts 11 which depend below the related side beam 9; the carriages 10 being connected together by a cross member 12.

Figure 7:
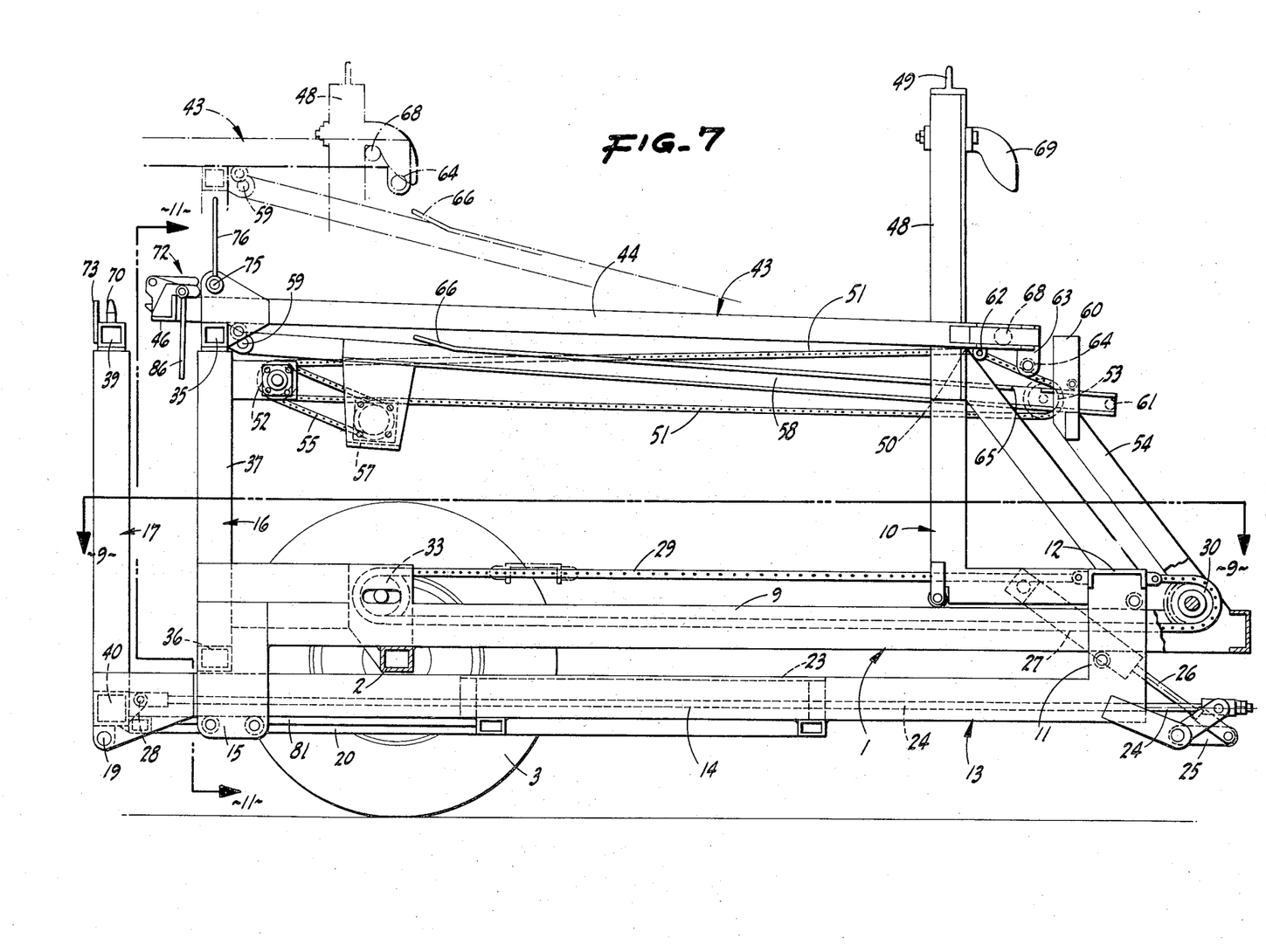
FIG. 7 is an enlarged side elevation corresponding to FIG. 1, but with the engine and hydraulic pump assembly omitted; the view showing—in broken lines—the upward extension of the telescopic inner wall, and the advanced position of the upper sliding frame after its escape from the guide channels.
Figure 8:
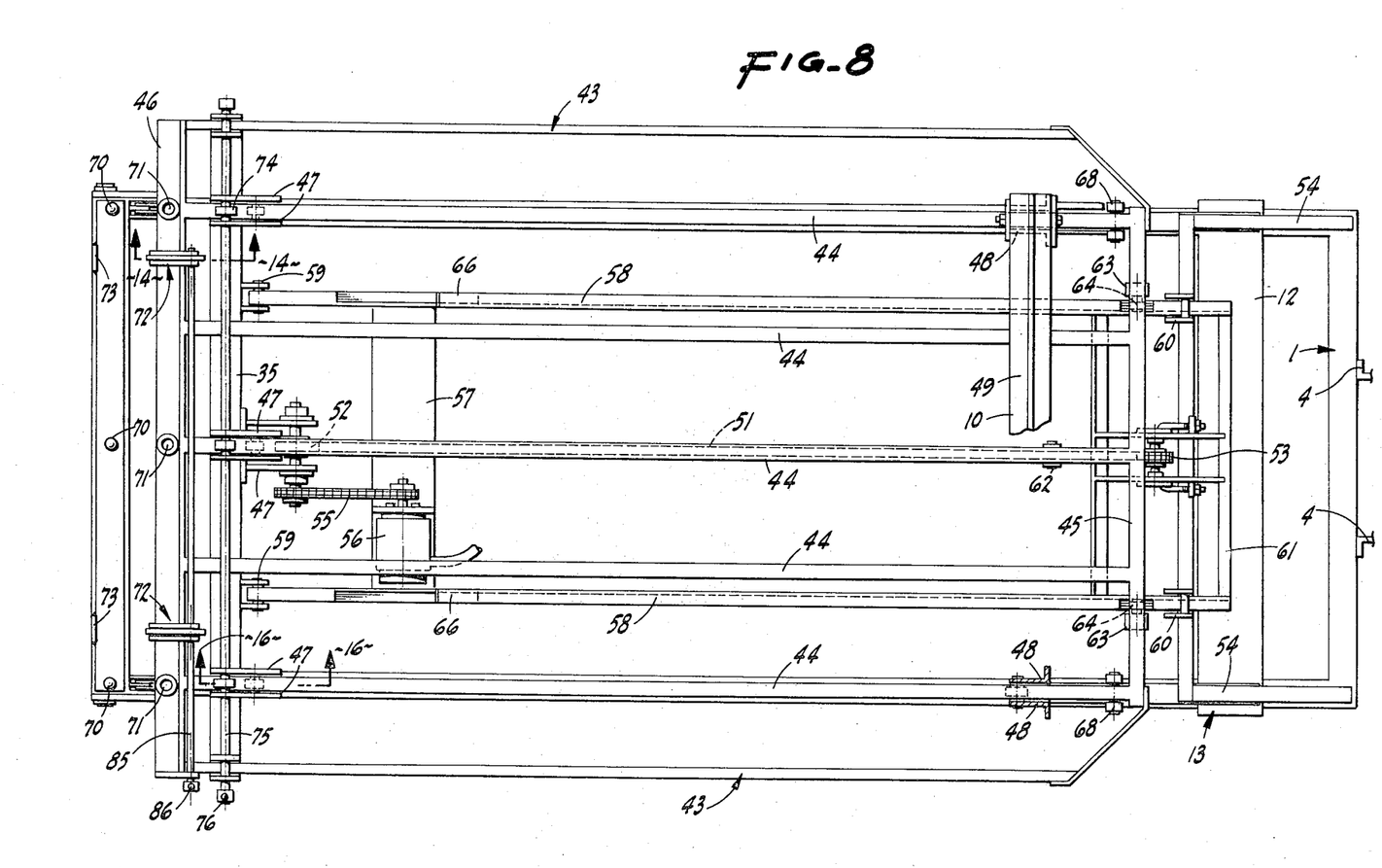
FIG. 8 is an enlarged plan view of the machine, again with the engine and hydraulic pump assembly omitted; the parts occupying the same positions as in full lines in FIGS. 1 and 7.
Figure 9:
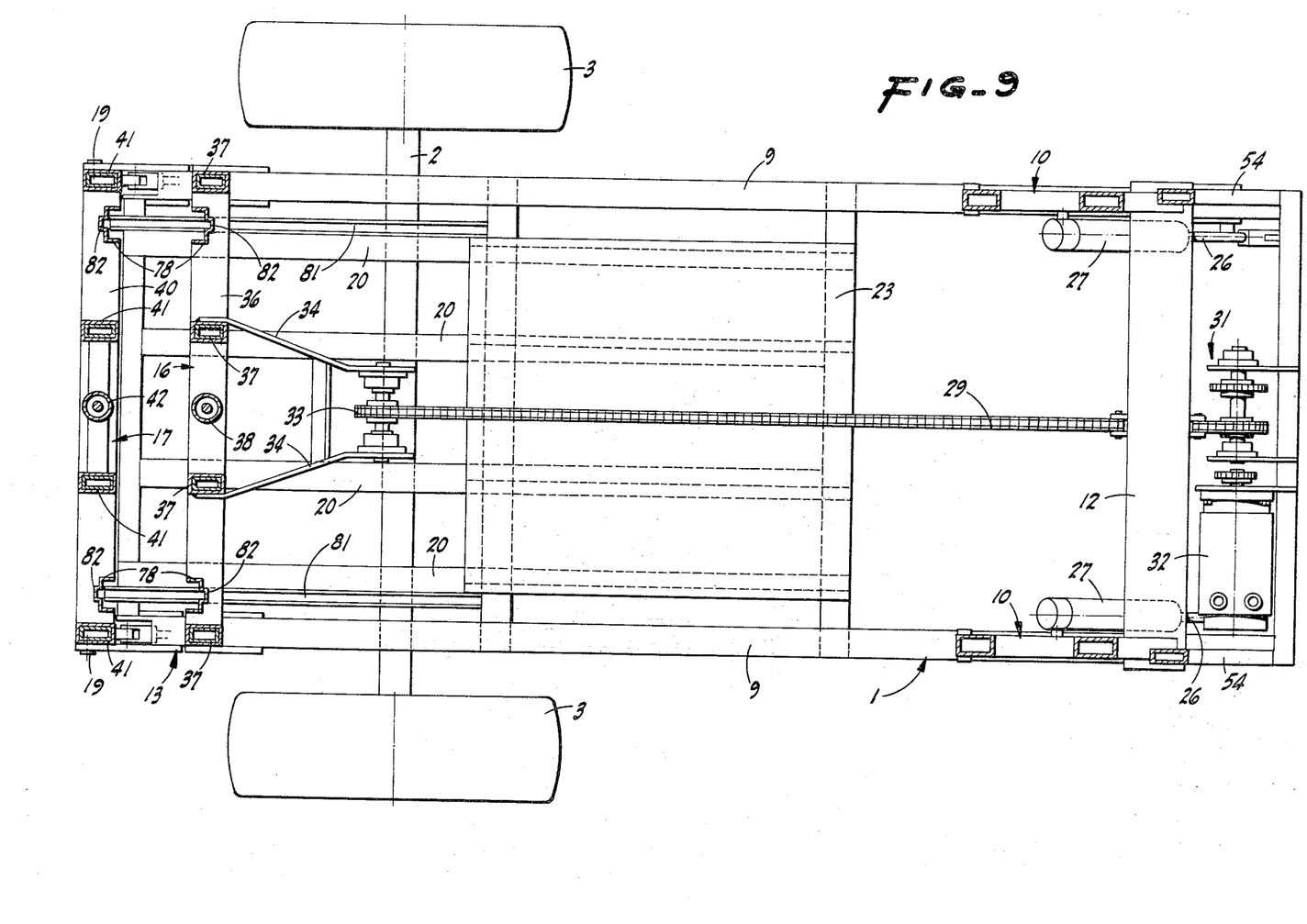
FIG. 9 is a sectional plan view on line 9—9 of FIG. 7.

A longitudinal, lower sliding frame, indicated generally at 13, is disposed beneath the main frame 1, and is of open-structure, rectangular form. Such lower sliding frame 13 (which is initially retracted as in FIGS. 1 and 7) includes longitudinal side beams 14 secured at their inner ends to the corresponding skirts 11, and intermediate their ends such side beams 14 pass in roller-supported relation through guides 15 depending from the rear end of the main frame 1.

At such rear end of the main frame 1, it is fitted—in rigid relation—with a rectangular, upstanding, transverse, open-structure wall indicated generally at 16. In corresponding relation, the sliding frame 13 is fitted—at its outer end and spaced from the wall 16—with a rectangular, upstanding, transverse, open-structure wall indicated generally at 17. The walls 16 and 17 provide, in facing relation, the inner wall and outer wall, respectively, of a baling chamber 18 formed therebetween when such walls are substantially spaced apart by advance of the lower sliding frame 13 from its initially retracted position to an advanced position, all in the manner as will hereinafter appear, but as shown—for example—in FIG. 2.

The normally upstanding outer wall 17 is pivoted slightly below its lower edge, as at 19, to the outer end of the lower sliding frame 13, and for downward and outward swinging motion to a substantially horizontal position (see FIG. 5) in which the upper surface of said down-swung wall 17 is substantially flush with the top of transversely spaced longitudinal bars 20 included low-level in the outer end portion or section of said lower sliding frame 13. Such low-level bars 20 form, between the outer end portions of the side beams 14, a horizontal cavity 21 adapted for the reception, in substantially matching relation, of a rectangular pallet 22 of standard type. The cavity 21 is open at its outer end to permit the pallet 22 to relatively slide out of the cavity and—in part at least—onto the outer wall 17 when the latter is in its down-swung position.

On a section immediately inwardly of the cavity 21, the lower sliding frame 13 includes, on top thereof, a floor plate 23 which is flush with the top surface of a pallet 22 disposed in cavity 21. Thus, an in-place pallet 22 and the floor plate 23 together define the entire bottom of the baling chamber 18 when there is maximum separation between the inner wall 16 and the outer wall 17, and which occurs upon full advance of said lower sliding frame 13.

The outer wall 17 is normally maintained in its upstanding position, and also—when desired—moved to its down-swung position, by means of the following arrangement:

A longitudinal rod 24 extends lengthwise laterally inwardly of each side beam 14 of the lower sliding frame 13, and—at the inner end—such rod is coupled to one end of a bellcrank lever unit 25 mounted in connection with said side beam 14; the other end of each such bellcrank lever unit 25 being connected to the piston rod 26 of a double-acting hydraulic power cylinder 27 attached to the related carriage 10.

At its outer end, each longitudinal rod 24 is pivoted, as at 28, to the outer wall 17 at a point adjacent but above the axis of pivot 19. It will thus be recognized that—upon push motion or advance of the rods 24—the outer wall 17 will be moved to its down-swung position, whereas—upon pull motion or retraction of the rods 24—said outer wall 17 will be returned to and maintained in its upstanding position.

The lower sliding frame 13 is adapted to be advanced and retracted by means of the following mechanism:

A longitudinally extending endless chain 29 turns at one end about a drive sprocket 30 included in a speed-reduction unit, indicated generally at 31, mounted on the front portion of the main frame 1 and driven by a reversible hydraulic motor 32. From the drive sprocket 30, the endless chain 29 extends forwardly to and turns about an idler sprocket 33 suitably journaled in a bracket structure 34 having fixed connection with the main frame 1. The upper run of the endless chain 29 is attached to the cross member 12 which spans between the carriages 10. Consequently, upon operation of the endless chain 29 to move its upper run toward the rear end of the main frame 1, the cross member 12, the carriages 10, and the lower sliding frame 13—together with the outer wall 17 supported thereby—are shifted in a corresponding direction whereby to move said outer wall 17 away from the inner wall 16, and in this manner to form or "open" the baling chamber 18. Conversely, when the upper run of the endless chain 29 is moved in a direction toward the front end of the main frame 1, the outer wall 17 is drawn toward the inner wall 16 of the baling chamber 18.

Figure 10:
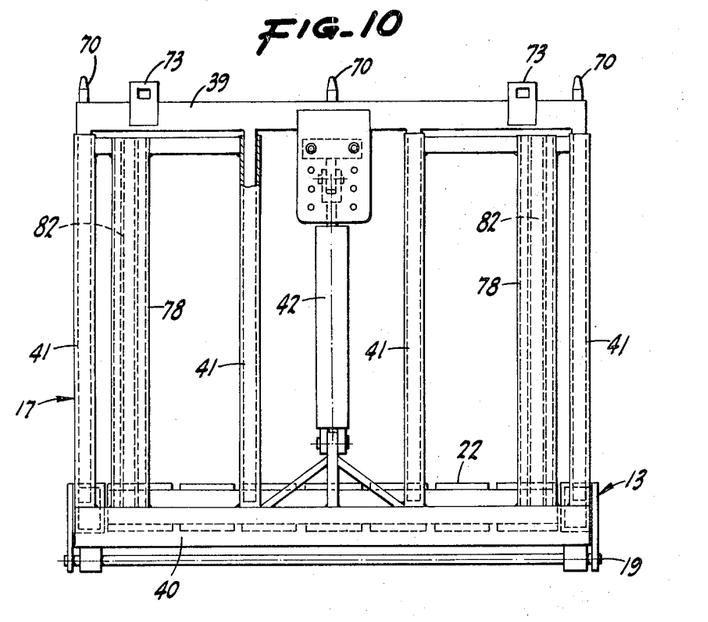
FIG. 10 is an enlarged, outside elevation of the outer wall of the baling chamber.
Figure 11:
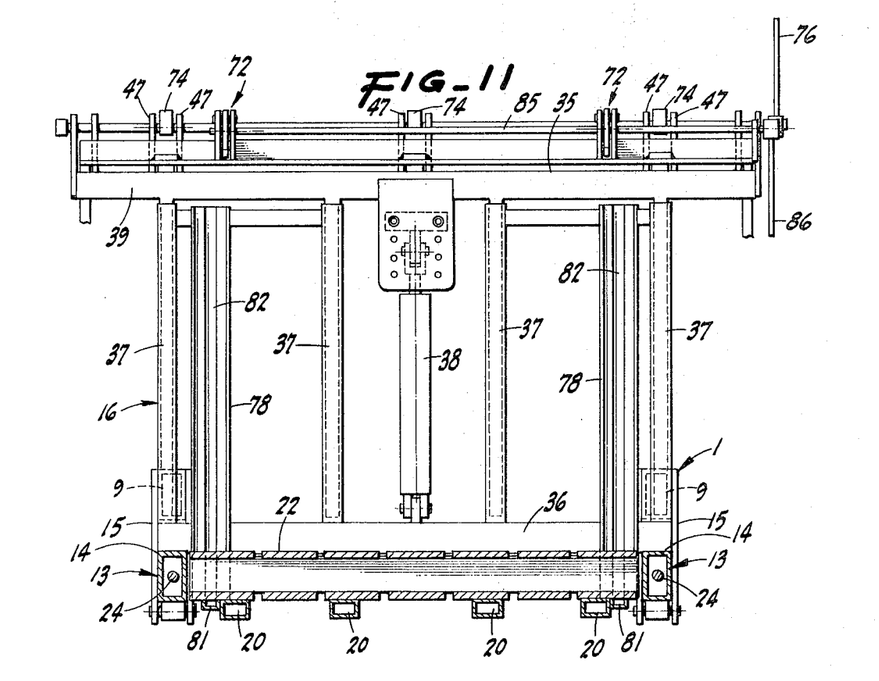
FIG. 11 is a sectional elevation on line 11—11 of FIG. 7; the view showing mainly the inner wall of the baling chamber.
Figure 12:
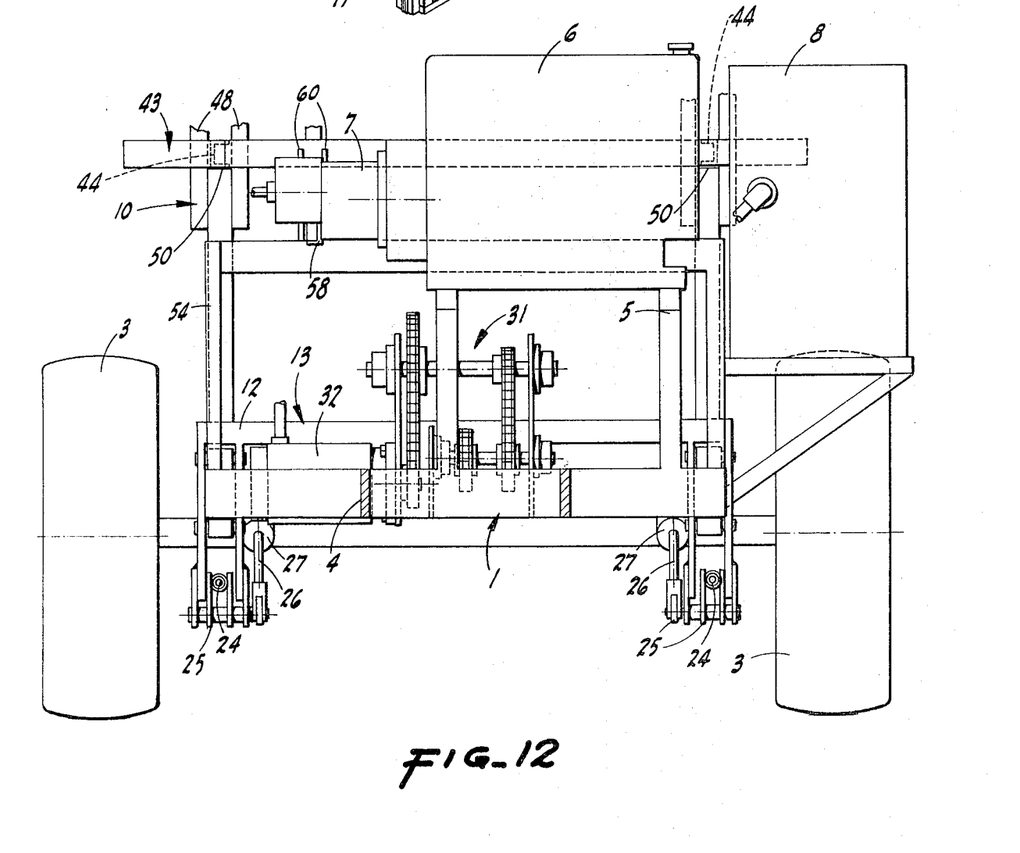
FIG. 12 is an end elevation of the machine; the view being of the hitch end of the machine.
Figure 13:
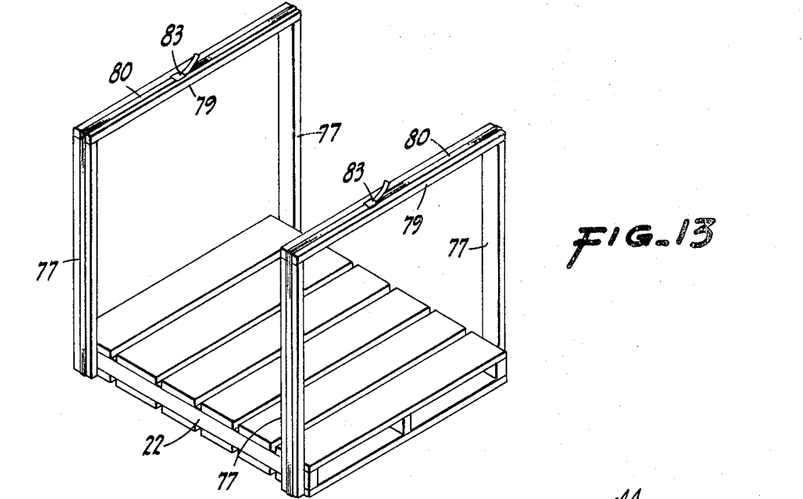
FIG. 13 is a perspective view illustrating—separate from the machine and without a bale therein—an assembly of a pallet, a bale-retention boards, and securing straps.

In order to increase the depth of the baling chamber 18, both the inner wall 16 and the outer wall 17 are of vertically telescopic construction. More particularly, the inner wall 16 includes—between a top cross rail 35 and a bottom cross rail 36—a plurality of transversely spaced telescopic posts 37; the inner wall 16 being extended or contracted by an upstanding power cylinder 38 connected between the cross rails 35 and 36 (see FIG. 11). Similarly, the outer wall 17 includes—between a top cross rail 39 and a bottom cross rail 40—a plurality of transversely spaced telescopic posts 41; the outer wall 17 being extended or contracted by an upstanding double-acting power cylinder 42 connected between the cross rails 39 and 40 (see FIG. 10). The power cylinders 38 and 40 are preferably connected in the valve-regulated conduit system of the machine in a manner to obtain simultaneous operation of said cylinders.

An initially retracted upper sliding frame, indicated generally at 43, is spaced a substantial distance above and initially entirely overlies the main frame 1; such upper sliding frame 43 being substantially rectangular and includes—adjacent the sides—longitudinal beams 44 connected at their inner ends by a cross bar 45. At the outer end of the upper sliding frame 43, the longitudinal beams 44, and the others which such frame includes, are connected by a cross bar 46 initially adjacent but slightly outwardly of the inner wall 16 of the baling chamber 18; the longitudinal beams 44 passing in roller-supported relation through guides 47 fixed in connection with and upstanding from the top rail 35 of the inner wall 16.

Each carriage 10 has a rigid post 48 upstanding therefrom, and such posts are connected at the top by a cross bar 49. The posts 48 are structured so that the corresponding longitudinal beams 44 slidably pass therethrough in engagement with and supported by a fulcrum member 50; such fulcrum members supporting the longitudinal beams 44 adjacent the inner end of the upper sliding frame 43 when the latter and the carriages 10 are in their initially retracted positions. Thus, in the initial position of the upper sliding frame 43, it is supported adjacent its outer end by the guides 47, and adjacent its inner end by the fulcrum members 50.

The upper sliding frame 43 is adapted to be advanced or retracted by means of a longitudinal endless chain 51 connected to such frame and extending, centrally of the machine, between a drive sprocket 52 journaled in connection with the inner wall 16 and an idler sprocket 53 journaled in connection with the upper portion of a rigid U-shaped leg structure 54 upstanding from the front end of the main frame 1. The drive sprocket 52 is actuated by means including an endless drive 55 leading from a reversible hydraulic motor 56 mounted in connection with a cross member 57 which spans in rigid relation between a pair of longitudinally extending, laterally opening guide channels 58.

The guide channels 58, which are disposed somewhat laterally inwardly from the corresponding longitudinal beams 44, are pivoted at one end, as at 59, to the top cross rail 35 of the inner wall 16, and thence such guide channels 58 extend at an inward and downward slope, and pass in slidable and guided relation through guides 60 which upstand from the rigid U-shaped leg structure 54. At their inner ends, the guide channels 58 are connected by a cross bar 61.

The connection between the endless chain 51 and the upper sliding frame 43 is, as indicated at 62, between the upper run of such chain and a point on the upper sliding frame 43 upwardly of its sides and adjacent but short of its inner end.

Ears 63 are fixed on and depend from the inner end of the upper sliding frame 43 adjacent the related guide channels 58. Such ears support laterally disposed rollers 64 adapted—upon relatively lowering of the inner end of said upper sliding frame 43 in the manner hereinafter described—to enter the corresponding guide channel 58 through an access opening 65 in the top of the latter. After each roller 64 enters the corresponding guide channel 58, it then—with advance of the upper sliding frame 43—travels in such guide channel 58 to adjacent but short of its forward end, whence such roller 64 escapes the guide channel 58 by reason of the termination, as at 66, of the top flange of the channel. The purpose of the guide channels 58, and the retention of the rollers 64 therein for a major portion of the advance of the upper sliding frame 43, will subsequently appear.

Figure 1:
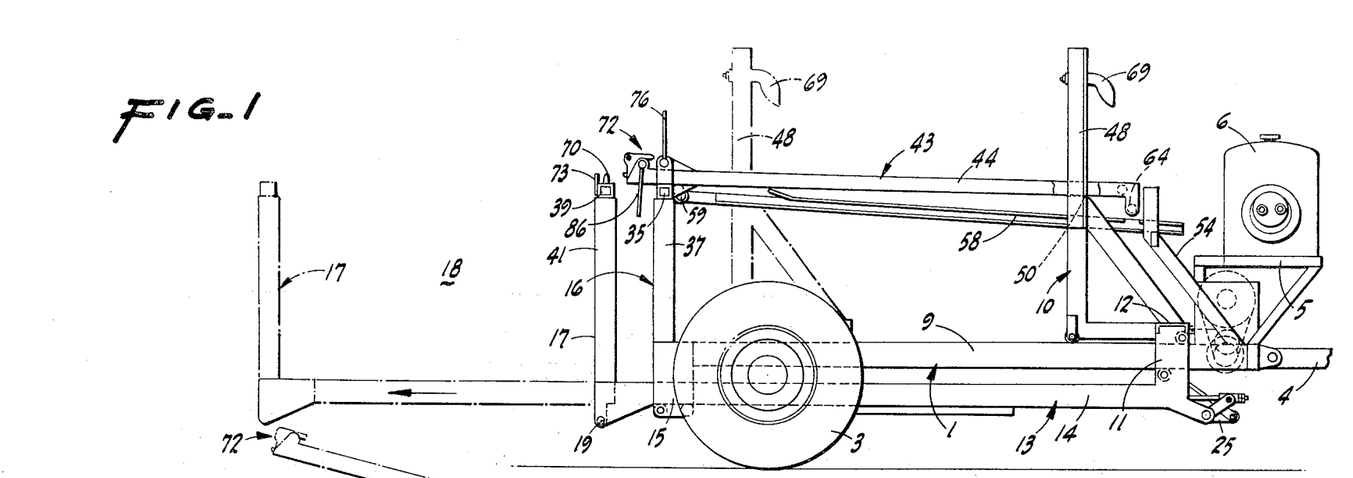
FIG. 1 is a somewhat diagrammatic side elevation of the machine showing—in full lines—the parts as positioned for movement of the machine from point to point; the view showing—in broken lines—the parts as positioned, including advance of the lower sliding frame, to define the open-sided baling chamber in full horizontal or end-to-end extent.

In the initial position of the parts—as for transport of the machine from point to point, or immediately prior to the start of a cut Christmas tree baling operation—the lower sliding frame 13 and the upper sliding frame 43 are both retracted, with the inner wall 16 and outer wall 17 then in relatively closely adjacent relation (see FIG. 1).

Preparatory to producing a bale of trees, the lower sliding frame 13 is fully advanced and which relatively widely spaces the walls 16 and 17 and forms or "opens" the baling chamber 18. Thereafter, the walls 16 and 17—which are telescopic—are vertically extended by the power cylinders 38 and 42 whereby the depth of the baling chamber—and hence its capacity—is increased. Nextly, a pallet 22 is placed in the cavity 21 together with said upstanding bale-retention boards as hereinafter described. The pallet 22 as so disposed, together with the floor plate 23, then forms the full bottom of the baling chamber 18; the pallet being positioned with its end openings facing longitudinally outward for reception of the forks of a fork lift truck in the manner also later described.

The next step in the operation is to fill the baling chamber 18 with a loose-bulk stack of cut Christmas trees 67; the trees being placed in such baling chamber 18 transversely of the machine and with some of the tree butts to the right and others to the left so as to balance the stack.

Figure 2:
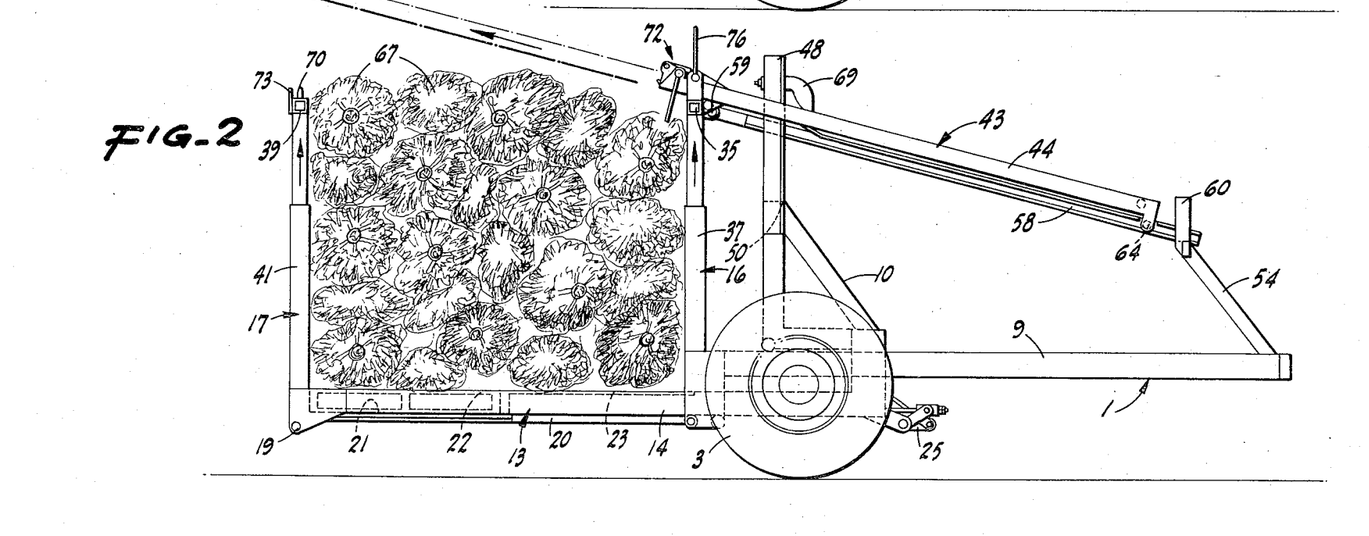
FIG. 2 is a similar view, but with the engine and hydraulic pump assembly omitted; the view showing—in full lines—the outer wall and the inner wall of the baling chamber as telescopically extended upwardly to define said baling chamber in full vertical or top-to-bottom extent; the view showing—in broken lines—the position of the upper sliding frame as initially advanced over the baling chamber and subsequent to loading of the latter with a loose-bulk stack of cut trees.

After the baling chamber 18 is filled with a loose-bulk stack of trees, the upper sliding frame 43 is fully advanced, and this occurs in the following manner and for the purpose of forming the top of the baling chamber 18:

Upon the lower sliding frame 13 being earlier advanced, the posts 48 and fulcrum members 50 likewise advanced, and this—accompanied by the upper sliding frame 43 and the guide channels 58 assuming a relatively steep outward and upward incline upon extension of the wall 16—caused the upper sliding frame 43 to lower at its inner end whence the rollers 64 thereon entered said guide channels 58 through access openings 65 (see FIG. 2). Thereafter, upon advance of the upper sliding frame 43, with the longitudinal beams 44 running through the guides 47, said frame 43 projects beyond said guides 47 still at a relatively steep incline to clear the top of the stack of trees in the baling chamber 18; such inclination being due to the rollers 64 traveling in the inclined guide channels 58. When maximum projection of the upper sliding frame 43 beyond the guides 47 is achieved, the rollers 64 escape the guide channels 58 at the terminations 66 of their top flanges, and—immediately upon such occurrence—the upper sliding frame 43 drops at its outer end by gravity, and assumes a substantially horizontal position with its said projecting portion forming the top of the baling chamber 18.

Figure 3:
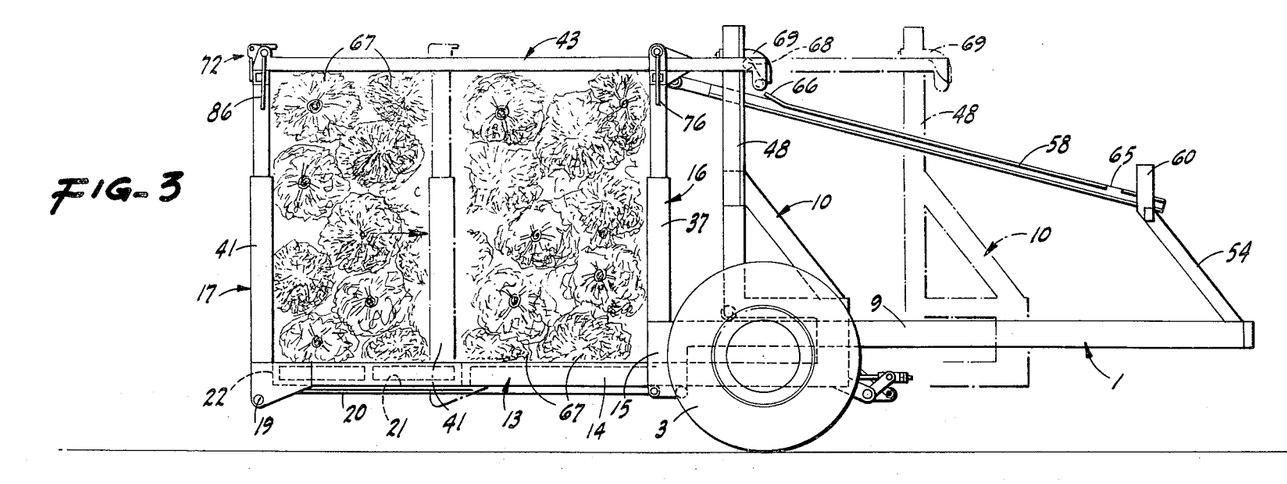
FIG. 3 is a similar view, but shows—in full lines—the upper sliding frame as lowered and latched to the outer wall in top-forming relation to the baling chamber; the view showing—in broken lines—the positions of the parts, including partial retraction of the lower and upper sliding frames, to reduce the horizontal extent of the baling chamber whereby to compress the stack of trees in a horizontal direction.
Figure 14:
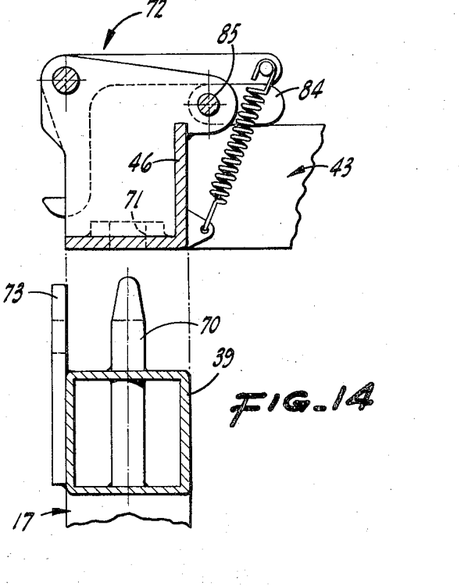
FIG. 14 is an enlarged fragmentary section on line 14—14 of FIG. 8; the view showing one of the latches as engaged between the outer end of the upper sliding frame and the upper end of the outer wall of the baling chamber.
Figure 15:
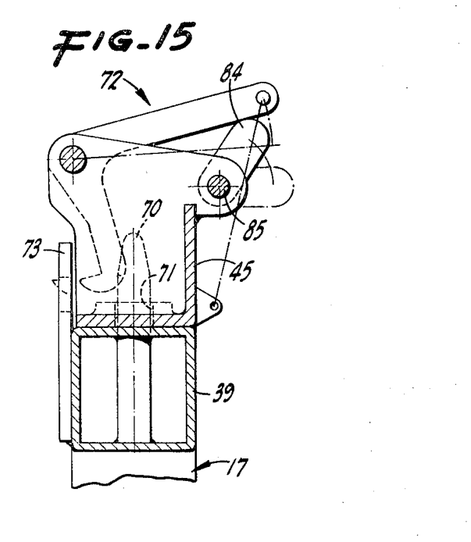
FIG. 15 is a similar view, but shows the manner of disengagement of said latches.

As the upper sliding frame 43 assumes such horizontal position, rollers 68 on the rear end of longitudinal beams 44 engage under movement-limiting hooks 69 on corresponding posts 48 (see FIG. 3). At the same time, end-tapered locator pins 70 upstanding from the top cross rail 39 of outer wall 17 enter receiving openings 71 in the outer cross bar 46 of said upper sliding frame 43. Simultaneously, spring-urged dog-legged catches 72—mounted in transversely spaced relation on said cross bar 46—engage with catch plates 73 on the top cross rail 39 of wall 17 (see, for example, FIGS. 3 and 14). With the catches 72 so engaged, the projecting portion of the upper sliding frame 43 is secured against upward displacement and is releasably held in top-forming relation on the baling chamber 18.

Figure 16:
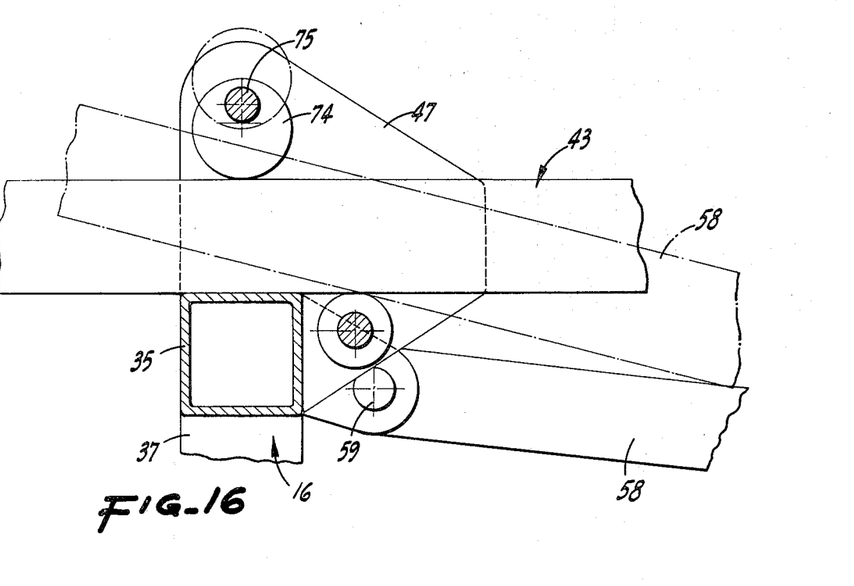
FIG. 16 is an enlarged fragmentary section on line 16—16 of FIG. 8; the view showing one of the eccentrics employed to vertically stabilize the upper sliding frame.

To remove excess vertical play of the longitudinal beams 44 in the guides 47, initially up-turned eccentrics 74 in such guides—carried on a common cross shaft 75—are turned down to substantially engage but not limit longitudinal sliding movement of said beams 44 (see FIG. 16). Such adjustment of the eccentrics 74 is accomplished simultaneously by a radial hand lever 76 on one end of the cross shaft 75.

The baling chamber 18 is provided—at the inner wall 16, as well as at the outer wall 17—with a pair of transversely spaced, upstanding bale-retention boards 77 inserted in vertical positioning channels 78 fixed on and upstanding from the bottom cross rails 36 and 40, respectively, of said inner wall 16 and outer wall 17. The boards 77 are inserted at the time the pallet 22 is placed in cavity 21 and prior to loading with trees and top-closing of the baling chamber 18 as previously described.

Figure 4:
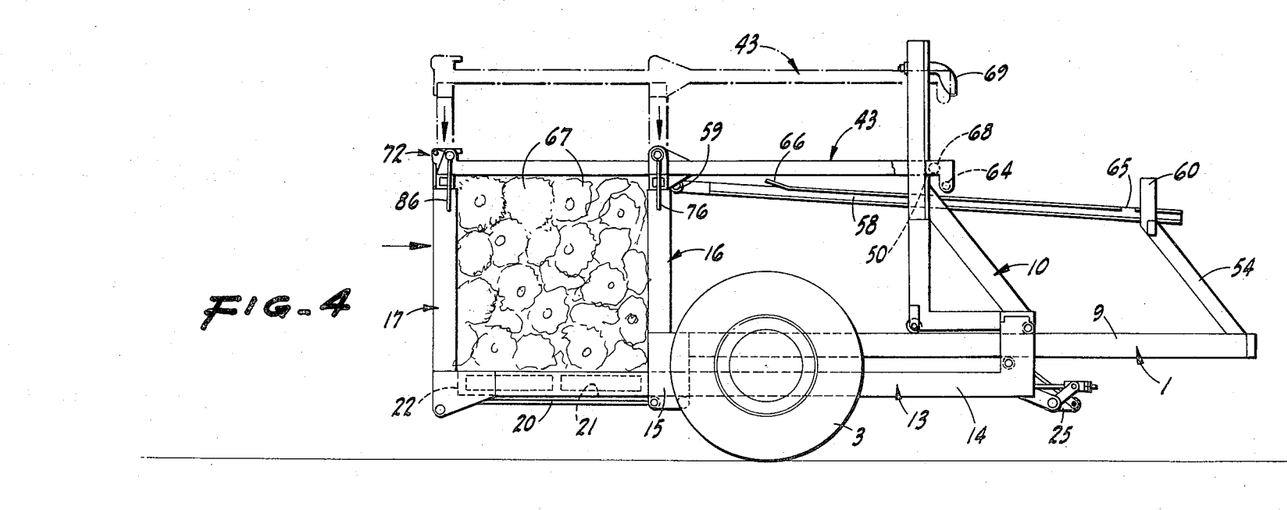
FIG. 4 is a similar view, but shows—in full lines—the positions of the parts, including partial retraction of the lower and upper sliding frames and contraction of the outer and inner telescopic walls, to reduce both the horizontal and vertical extent of the baling chamber whereby to compress the stack of trees in both a horizontal and a vertical direction; the view showing—in broken lines—the latched, partially retracted position of the upper sliding frame and the upwardly extension of the telescopic outer and inner walls of the baling chamber prior to said reduction in the vertical extent of said baling chamber.

With the baling chamber 18 loaded and top-closed, a bale-forming operation ensues, as follows:

The lower sliding frame 13 is first partially retracted; i.e., until the floor plate 23 retracts under the main frame 1 so that the pallet 22 alone remains at the bottom of the baling chamber 18. With such partial retraction of the lower sliding frame 13, the outer wall 17 is drawn toward the inner wall 16; this reducing the horizontal extent of the baling chamber 18 and imposing a forceful horizontal compression on the initially loose-bulk stack of trees in such chamber. Nextly, the walls 16 and 17 are telescoped downwardly which not only reduces their vertical extent, but also that of the baling chamber whence a forceful vertical compression is exerted on the already horizontally compressed stack of trees in such chamber (see FIGS. 3 and 4).

When the walls 16 and 17 are reduced in their vertical extent, as above, the upper sliding frame 43 is, of course, also lowered, and which results in escape of the rollers 68 from the hooks 69 so that when the upper sliding frame 43 is later retracted there is no hindrance by such hooks.

The horizontal and vertical compression actions, as above, reduces the stack of trees in the baling chamber 18 to a compact bale preparatory to strapping and removal thereof from the machine; such strapping and removal being accomplished as follows:

After the bale is formed, horizontal bale-retention boards 79 are placed atop the bale in a position alined with and spanning between the corresponding upstanding bale-retention boards 77. Then the bale is surrounded with metal straps 80 (placed either manually or mechanically) which engage and bind the pallet 22 and boards 77 and 79 together in order to maintain the bale intact after removal from the machine. To aid in placement of the metal straps 80 about the bale, horizontal groove members 81 are mounted on the lower sliding frame 13 in a plane beneath the cavity 21 and adapted to register with corresponding vertical groove members 82 formed with the vertical, board-positioning channels 78; the metal straps 80 being pushed through such registering groove members, and thence drawn across the top of the bale, followed by the strap ends then being clamped together as at 83.

Figure 5:
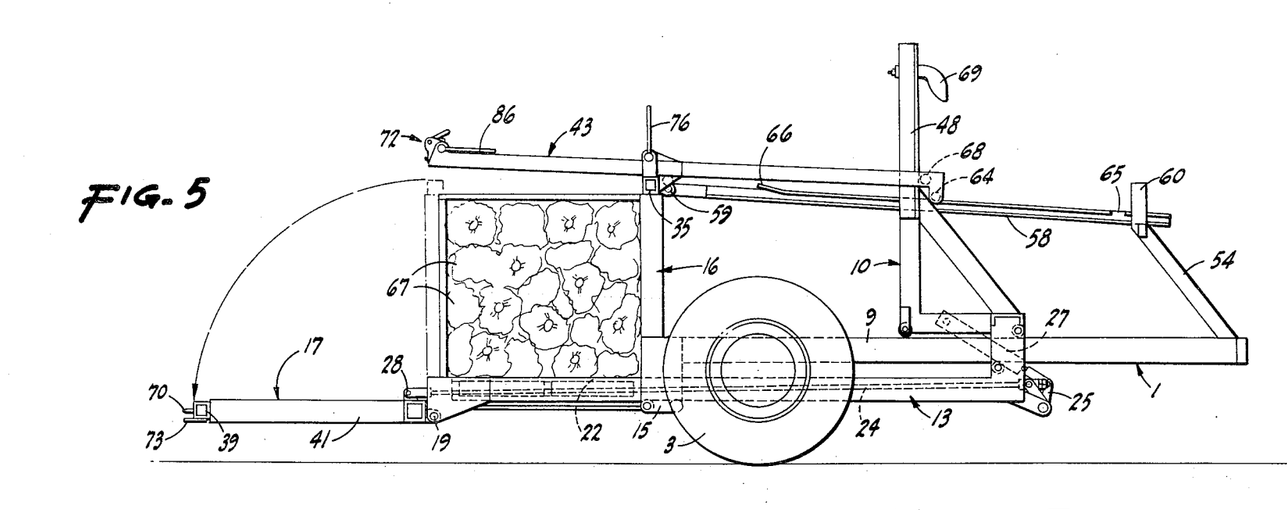
FIG. 5 is a view corresponding to the full-line showing of FIG. 4, but shows the top-forming upper sliding frame as unlatched, and the outer wall of the baling chamber as swung down to a substantially horizontal position preparatory to removal of the bale from the machine.
Figure 6:
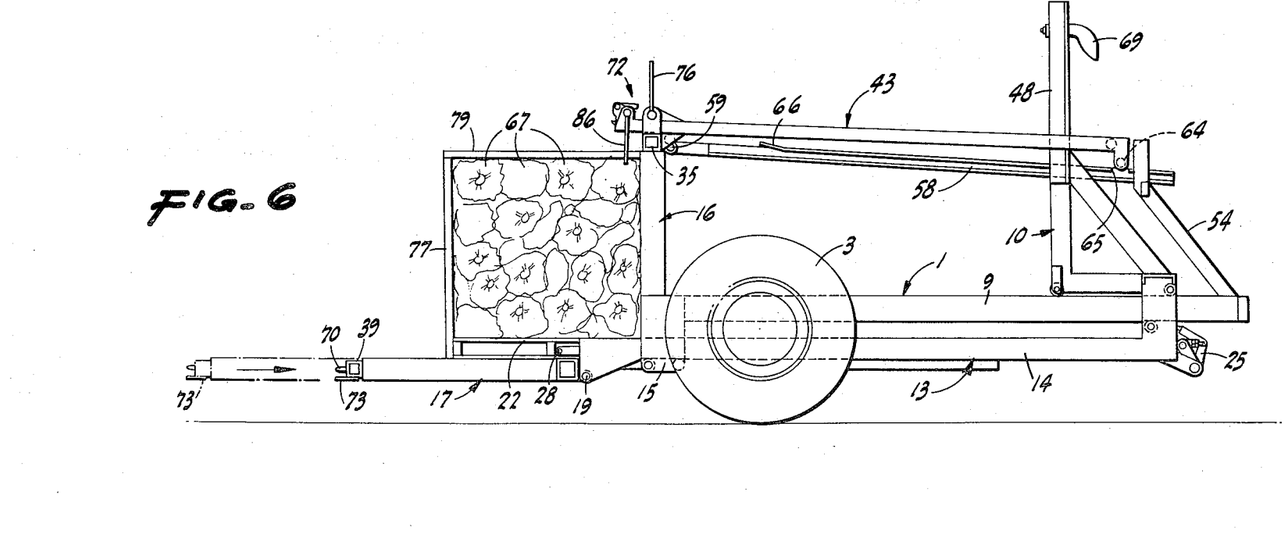
FIG. 6 is a view corresponding to FIG. 5, but shows the lower sliding frame and the upper sliding frame fully retracted; the bale of trees, upon said full retraction of said lower sliding frame, being shifted in part onto the swung-down outer wall to facilitate removal of the bale from the machine.

After the bale is formed and strapped, the doglegged catches 72 are released (see FIG. 5) and the upper sliding frame 43 is fully retracted (see FIG. 6) to its starting position, and with the rollers 64 disengaged from the guide channels 58. Simultaneous release of the catches 72 is accomplished by means of trigger fingers 84 mounted on a common cross shaft 85 journaled on the outer end of the upper sliding frame 43; such cross shaft 85 being part-rotated by a radial hand lever 86 to swing the trigger fingers 84 upwardly whence they engage and release said catches 72. Also, as shown in FIGS. 5 and 6, the walls 17 is swung from its upstanding position downwardly and outwardly to its substantially horizontal position. Thereupon, the lower sliding frame 13 is retracted to its starting position, resulting in the bale (which bears against the inner wall 16) being relatively slid—partially at least—onto the down-swung outer wall 17. With the bale in this accessible position, a fork lift truck approaches lengthwise of the machine and toward the bale, picking up the pallet 22 on the forks and thence carrying the bale to and placing it on an adjacent field transport vehicle (not shown). The field transport vehicle travels (with a load of the bales thereon) to a loading station at which—by means of another fork lift truck—the bales are transferred to a highway cargo vehicle (not shown) for transport to market.

After the bale is removed from the machine, as above, the down-swung outer wall 17 is returned to its upstanding position, whereupon the machine is ready to start the next baling operation.

By appropriate placement of sheets thereof, protective cardboard may be employed on certain faces of the bale.

From the foregoing description, it will be readily seen that there has been produced such a Christmas tree baling machine at substantially fulfills the objects of the invention, as set forth herein.

While this specification sets forth in detail the present and preferred construction of the baling machine, still in practice such deviations from such detail may be resorted to as do not form a departure from the spirit of the invention as defined by the appended claims.

I claim:

1. A cut Christmas tree baling machine comprising an aboveground longitudinal main frame, a vertical transverse wall upstanding from one end of the main frame, a longitudinal lower sliding frame on the main frame extending to an outer end termination outwardly of said wall, a vertical transverse wall upstanding from the outer end of the lower sliding frame, said lower sliding frame being movable between an initially retracted position and an advanced projecting position in which the walls are relatively widely spaced to define the inner and outer walls of an open-sided baling chamber, the bottom of the baling chamber being delineated by the projecting portion of such lower sliding frame as advanced, power means to advance and retract the lower sliding frame, and means adapted to provide a releasably secured top on the baling chamber without obstructing relative approaching movement of said walls upon retraction of the lower sliding frame.

2. A machine, as in claim 1, in which said last-named means includes a longitudinal upper sliding frame extending to an outer end termination outwardly of the inner wall, said upper sliding frame being movable between an initially retracted position and an advanced projecting position spanning between the tops of the walls, the top of the baling chamber being delineated by the projecting portion of such upper sliding frame as advanced, means on the top of the inner wall guiding the upper sliding frame, releasable catch means between the outer end of said projecting portion of the upper sliding frame and the top of the outer wall, and power means to advance and retract the upper sliding frame.

3. A machine, as in claim 2, including longitudinal guide members associated with the main frame and inclined upwardly toward the inner wall, and elements on the upper sliding frame cooperating with said guide members to cause the upper sliding frame as advanced to assume an upward and outward incline, said elements escaping the guide members upon completion of advance of the upper sliding frame whereby the projecting portion thereof gravitates from its upwardly and outwardly inclined position downwardly to said position spanning between the tops of the walls.

4. A machine, as in claim 3, in which the longitudinal guide members are laterally opening channels attached at their corresponding ends to the inner wall adjacent the top thereof and at the other ends slidably supported from the main frame, the inner and outer walls each being vertically telescopic, and power means to extend and contract said walls; the channels at such corresponding ends being raised or lowered upon extension or contraction, respectively, of said walls, and said cooperating elements being rollers which run in the channels upon advance of the upper sliding frame.

5. A machine, as in claim 2, in which the power means to advance and retract the lower sliding frame and the power means to advance and retract the upper sliding frame each comprises a longitudinal, reversibly driven, endless chain journaled on the main frame and connected to the related sliding frame.

6. A machine, as in claim 1, in which the inner and outer walls are each vertically telescopic, and power means to extend and contract said walls; the means providing said releasably secured top being effective without obstructing contraction of said walls from their extended position.

7. A machine, as in claim 1, in which the outer and initially upstanding wall is pivoted at its lower end on the lower sliding frame for outward and downward swinging to a substantially horizontal position, and power means to swing the outer wall between its upstanding position and said down-swung position while normally holding such outer wall in said upstanding position.

8. A machine, as in claim 7, in which the lower sliding frame includes transversely spaced carriages longitudinally movable on the main frame, and said last-named power means comprises longitudinal rods on the lower sliding frame corresponding to the carriages, the rods being pivoted at their outer ends to the outer wall in vertically spaced relation to the pivotal axis of said outer wall, a double-acting power cylinder on each carriage, and a carriage-mounted lever unit connected between each such power cylinder and the inner end of the corresponding rod.

9. A machine, as in claim 8, including a post upstanding from each carriage; the means to provide a releasably secured top on the baling chamber including a longitudinal upper sliding frame extending to an outer end termination outwardly of the inner wall, said upper sliding frame being movable between an initially retracted position and an advanced projecting position spanning between the tops of the walls, the top of the baling chamber being delineated by the projecting portion of such upper sliding frame as advanced, means on the top of the inner wall guiding the upper sliding frame, releasable catch means between the outer end of said projecting portion of the upper sliding frame and the top of the outer wall, and power means to advance and retract the upper sliding frame; there being means on the posts slidably supporting the upper sliding frame.

10. A machine, as in claim 1, in which the projecting portion of the lower sliding frame as advanced includes a cavity in an outer section thereof dimensioned and adapted for reception in removable relation of a pallet; the inner section of said projecting portion of the lower sliding frame being provided with a floor plate.

* * * * *